Sept. 2, 1924.  
R. M. COOP  
SEED PAN  
Filed Feb. 18, 1922
1,507,468
2 Sheets-Sheet 1
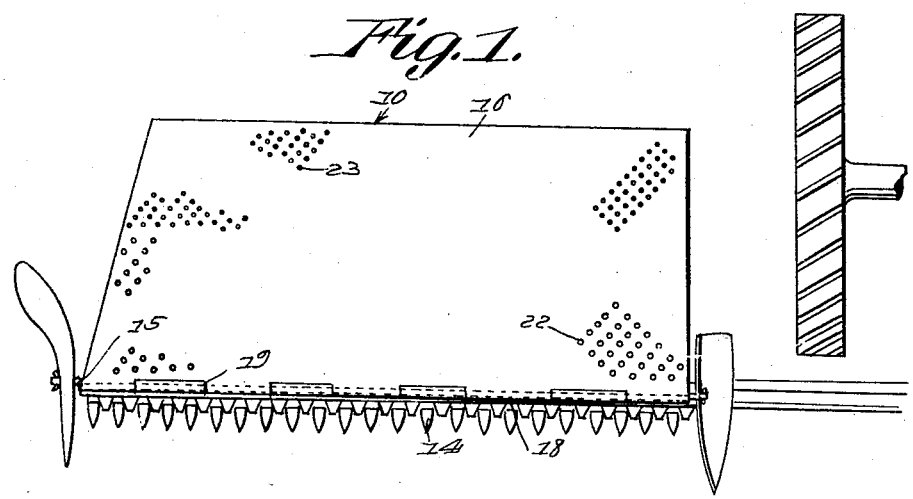
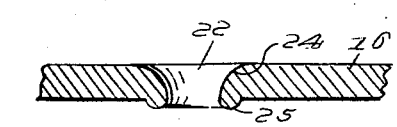
Inventor  
Rodney M. Coop,  
By  
Attorney

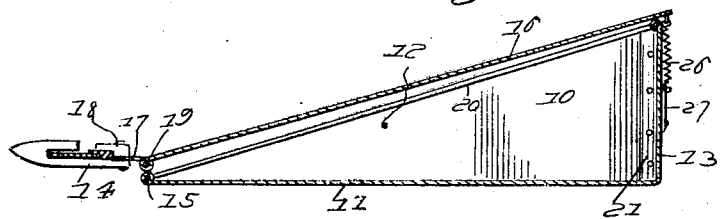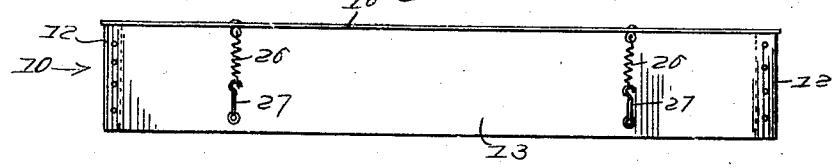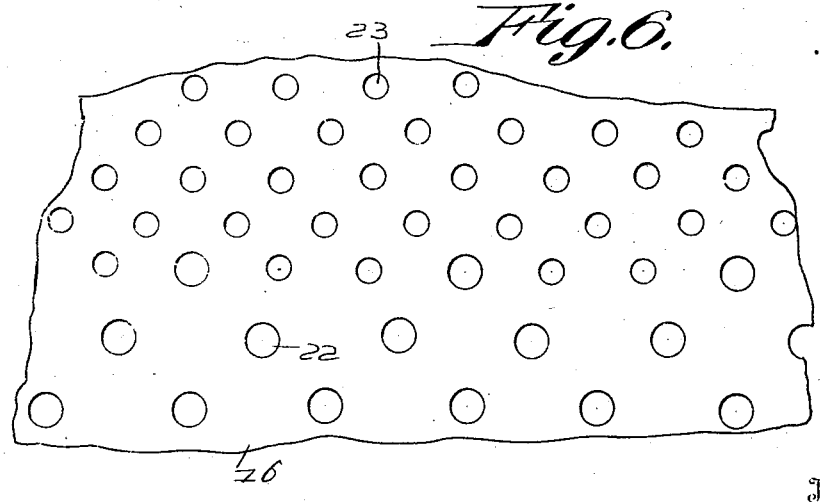

Patented Sept. 2, 1924.

1,507,468

UNITED STATES PATENT OFFICE.

RODNEY M. COOP, OF GADSDEN, TENNESSEE.

SEED PAN.

Application filed February 18, 1922. Serial No. 537,494.

*To all whom it may concern:*

Be it known that RODNEY M. COOP, a citizen of the United States of America, residing at Gadsden, in the county of Crockett and State of Tennessee, has invented new and useful Improvements in Seed Pans, of which the following is a specification.

The object of the invention is to provide as an attachment for mowing machines a receptacle or pan for catching lespadeza seed and more particularly the ripe seed which is detached in the course of the mowing operation and of separating the same from trash, fibres, twigs and the like to prevent the falling of the seed upon the ground and enable the same to be used otherwise in the discretion of the farmer; and more particularly to provide what may be designated as a seed pan of such a construction as to permit of the application or attachment thereof with facility to the ordinary construction of finger bar of a mowing or reaping machine of convenient type under such conditions as not to interfere with the operation of the machine in other respects and practically insure the catching of all of the seed as it falls from the plants; and with these objects in view the invention consists in a construction and combination of parts of which a preferred embodiment is shown in the accompanying drawings, wherein:—

Figure 1 is a plan view of a seed pan embodying the invention applied in the operative position to a mowing machine of which a portion is indicated.

Figure 2 is a longitudinal sectional view of the same.

Figure 3 is a rear view of the pan.

Figure 4 is a detail view of the pan attaching rod and reinforcing frame to which the side and rear walls of the pan are secured.

Figure 5 is a detail view in section and enlarged of the mounting and joint of the seed pan and cover.

Figure 6 is an enlarged plan view of a portion of the seed pan cover to show the preferred specific arrangement of the openings or perforations therein.

Figure 7 is a detail sectional view enlarged of a portion of the pan cover to show the approved form of opening or perforation designed for the reception of the seed.

The device consists essentially of a forwardly tapered or wedge shaped receptacle 10 consisting of a bottom 11, side walls 12 and a rear wall 13, which is preferably struck from sheet metal or formed by pressure or otherwise as by means of a die or by drawing, to the end that there may be no joints therein, the reduced front edge of the receptacle being pivotally supported upon the finger bar 14 of the mowing machine when in use, by means of a pivot rod 15 or its equivalent which may be attached in any suitable or preferred manner to the finger bar or any convenient portion of the frame of the mowing machine; supplemented by a screening lid or cover 16 which closes the upper side of the receptacle and at its forward depressed end, arranged in the plane of the cutter bar of the mowing machine is equipped with an attaching leaf 17 adapted for engagement by the rail plates or clamp plates 18 ordinarily forming a part of the cutting mechanism of the machine, the lid or cover proper being hinged as at 19 to said leaf so as to be free for vertical swinging movement either with or independently of the receptacle 10 which as above noted is in turn hingedly mounted upon the cutter bar through the rod 15.

A reinforcing frame 20 of which the side arms are hingedly mounted upon the rod 15 is beaded into the upper edges of the walls of the receptacle to afford strength to the structure which may further be reinforced by corner brace plates 21.

The openings in the screening lid or cover of the receptacle are preferably graded in size, those of larger diameter shown at 22 being arranged near the forward edge of the plate while those of smaller diameter shown at 23 are arranged in rear thereof, these openings being disposed in series arranged on oblique lines which intersect preferably at angles of 90° so that as the seed more or less mixed with fibres and trash fall upon the plate and the tendency of grain or other vegetation extending over or coming into contact with or falling upon the upwardly and rearwardly inclined surface of the lid tend to sweep the surface rearwardly, the seed finds its way through the openings and falls into and is deposited into the receptacle for subsequent access by raising the lid or cover. The readily detachable ripe seed naturally fall from the plants as they are first encountered by the cutter machanism and hence are deposited upon the front portion of the surface of the lid or cover from which they pass through the larger openings 22 located near the plane of the cutter bar, while the less ripe seed falling with the trash are adapted to be received by the smaller openings as the trash is swept rearwardly over the surface of the plate, while at the same time the smallness of the openings tends to separate the trash from the seed and prevent the passage of the former into the interior of the receptacle.

Moreover the openings or perforations in the plate are preferably formed by a solid punch which instead of cutting a blank out of the plate serves merely to bend or deflect the material thereof downwardly or inwardly as shown more clearly in Figure 7 to provide a funnel like form for the opening having the flared mouth 24 and depending lips 25. It has been found in practice that this construction of openings serves effectively to permit the entrance of the seed while permitting the trash to be swept over the same for discharge at the rear end of the lid or cover.

The lid or cover is free to vibrate vertically or to permit of independent vibration of the cutter bar and in order to prevent displacement of the lid springs 26 at the rear edge thereof are connected with hooks 27 tending to yieldingly maintain the rear portion of the lid in bearing contact with the upper edges of the wall of the receptacle. It will also be obvious that the mounting of the receptacle is such as to permit the same to follow irregularities in the surface of the soil and correspondingly permit a vertical vibration of the cutter bar without disturbing the relative relations of the parts.

Having described the invention, what is claimed as new and useful is:—

1. A seed pan for mowing machines having a receptacle and means for pivotally mounting the front edge thereof upon the finger bar of a cutting mechanism, a screening cover for the receptacle provided with openings for the reception of seed dropped from plants engaged by the cutting mechanism and passing over the surface of the cover, the means for pivotally mounting the receptacle consisting of a pivot rod disposed parallel with the cutter bar, and a reinforcing rod formed with terminal eyes pivotally engaging the pivot rod and being crimped into the side walls of the receptacle to reinforce the same.

2. A seed pan for mowing machines having a receptacle and means for pivotally mounting the front edge thereof upon the finger bar of a cutting mechanism, a screening cover for the receptacle provided with openings for the reception of seed dropped from plants engaged by the cutting mechanism and passing over the surface of the cover, the cover having a hingedly connected forwardly extending leaf for engagement by the clamp plates of the cutter bar of the cutting mechanism, springs connected at the rear edge of the cover, and hooks carried on the outer face of the rear walls of the receptacle and detachably engaging the springs to yieldingly maintain the rear portion of the cover in bearing contact with the upper edges of the wall of the receptacle.

In testimony whereof he affixes his signature.

RODNEY M. COOP.